(12) United States Patent
Anzai et al.

(10) Patent No.: US 9,810,516 B2
(45) Date of Patent: Nov. 7, 2017

(54) MEASURING APPARATUS AND SUPPORT MECHANISM OF COLUMNAR WORK PIECE

(71) Applicant: MITUTOYO CORPORATION, Kanagawa (JP)

(72) Inventors: Hirotada Anzai, Schaumburg, IL (US); Tomomitsu Sugawara, Tochigi (JP); Monya Fujiwara, Shanghai (CN)

(73) Assignee: MITUTOYO CORPORATION, Kanagawa (JP)

( * ) Notice: Subject to any disclaimer, the term of this patent is extended or adjusted under 35 U.S.C. 154(b) by 149 days.

(21) Appl. No.: 15/049,262

(22) Filed: Feb. 22, 2016

(65) Prior Publication Data

US 2016/0258734 A1    Sep. 8, 2016

(30) Foreign Application Priority Data

Mar. 4, 2015  (JP) ................................ 2015-042735

(51) Int. Cl.
  *G01B 21/04*  (2006.01)
  *G01B 5/008*  (2006.01)
  *G01B 7/008*  (2006.01)

(52) U.S. Cl.
  CPC ............. *G01B 5/008* (2013.01); *G01B 7/008* (2013.01); *G01B 21/047* (2013.01)

(58) Field of Classification Search
  CPC .......... G01B 5/004; G01B 5/008; G01B 5/12; G01B 5/20; G01B 7/004; G01B 7/008;
  (Continued)

(56) References Cited

U.S. PATENT DOCUMENTS

| 4,447,959 A * | 5/1984 | Watanabe et al. ....... G01B 5/12 |
|  |  | 33/544.5 |
| 6,725,735 B2 * | 4/2004 | Hjelm ................... B23Q 17/00 |
|  |  | 73/865.8 |
| 2011/0247227 A1 * | 10/2011 | Stamenkovic ......... G01B 5/012 |
|  |  | 33/503 |

FOREIGN PATENT DOCUMENTS

| JP | 3569622 B2 | 9/2004 |
| JP | 4331486 B2 | 9/2009 |
| JP | 4820681 B2 | 11/2011 |

OTHER PUBLICATIONS

"Website printout of Komatsu Crank•Camshaft Measuring Machine GDB Series," Jan. 2006.

* cited by examiner

*Primary Examiner* — R. A. Smith
(74) *Attorney, Agent, or Firm* — Greenblum & Bernstein, P.L.C.

(57) ABSTRACT

A measuring apparatus includes a first end support portion supporting a first end of the columnar work piece; a second end support portion supporting a second end of the columnar work piece; and a measurement device having a probe which measures the columnar work piece supported by the first end support portion and the second end support portion. The first end support portion includes a first end support body attachably and detachably fitting into a centering aperture of the first end of the columnar work piece. The first end support body includes at least two cut-outs, and in a state where the first end support body is fitted into the centering aperture, an interior surface of the centering aperture is visible to the exterior through the cut-outs. The measurement device inserts the probe into the centering aperture through the cut-outs and measures the interior surface of the centering aperture.

5 Claims, 15 Drawing Sheets

(58) Field of Classification Search
CPC ........ G01B 7/28; G01B 21/04; G01B 21/047;
G01B 21/14; G01B 21/20
USPC .......................................... 33/503, 542, 543
See application file for complete search history.

MEASURING APPARATUS AND SUPPORT MECHANISM OF COLUMNAR WORK PIECE

CROSS-REFERENCE TO RELATED APPLICATIONS

The present application claims priority under 35 U.S.C. §119 of Japanese Application No. 2015-042735, filed on Mar. 4, 2015, the disclosure of which is expressly incorporated by reference herein in its entirety.

BACKGROUND OF THE INVENTION

1. Field of the Invention

The present invention relates to a measuring apparatus and a support mechanism of a columnar work piece. Specifically, the present invention relates to a support for a measuring apparatus measuring an elongated, columnar work piece.

2. Description of Related Art

Measuring apparatuses measuring a shape of an elongated, columnar work piece are known (for example, http://www.komatsu-machinery.co.jp/HP/japanese/seihin_kousaku_gdb.html, Japanese Patent No. 3,569,622, Japanese Patent No. 4,331,486, and Japanese Patent No. 4,820,681). For example, in http://www.komatsu-machinery.co.jp/HP/japanese/seihin_kousaku_gdb.html, a measuring apparatus is disclosed which measures a shape of a columnar work piece such as a crank or cam shaft of an automobile. The measuring apparatus supports a top end portion of the columnar work piece so as to allow rotation of the columnar work piece and also supports a bottom end portion of the columnar work piece on a rotary table. In addition, while rotating the columnar work piece by rotating the rotary table, a stylus head makes contact from one side of the columnar work piece. This process is repeated in order, beginning at the top and moving toward the bottom.

When measuring the shape of the columnar work piece, the columnar work piece must be supported. Tapered centering holes are provided to both end surfaces of the columnar work piece, and a support mechanism supports the columnar work piece by fitting a conical or round body into these centering holes. The conical or round body used as such a clamp is referred to as a work piece centering device. The work piece centering device is monitored so as to have a prescribed shape, e.g. being highly conical or highly spherical (geometric deviation). The columnar work piece is centered by holding both end surfaces of the columnar work piece between such work piece centering devices and, moreover, accuracy of the centering holes (inwardly tapered surfaces) of the columnar work piece is calculated by inference from an inclination of the columnar work piece.

Although dimensions and tolerances are strictly managed for the work piece centering device, the devices nevertheless do not have completely regulated shapes (for example, a sphere). Calculating the centering hole (inwardly tapered surface) by inference from the work piece centering device is no more than an indirect measurement and cannot be said to accurately measure the shape of the columnar work piece itself. However, because the work piece centering device is fitted into the centering hole, it is also not possible to insert a probe into the centering hole. Accordingly, in conventional measuring apparatuses, it has not been possible to accurately measure a centering hole (inwardly tapered surface) of a columnar work piece.

SUMMARY OF THE INVENTION

The present invention provides a measuring apparatus capable of accurately measuring a shape of an end surface of a columnar work piece.

A measuring apparatus according to the present invention is a measuring apparatus measuring an elongated, columnar work piece having a centering hole (centering aperture) at two ends. The measuring apparatus includes a first end support portion supporting a first end of the columnar work piece; a second end support portion supporting a second end of the columnar work piece; and a measurement device having a probe which measures the columnar work piece supported by the first end support portion and the second end support portion. The first end support portion includes a first end support body attachably and detachably fitting into the centering hole of the first end of the columnar work piece. The first end support body includes at least two cut-outs, and in a state where the first end support body is fitted into the centering hole, an interior surface of the centering hole is visible to the exterior through the cut-outs. The measurement device inserts the probe into the centering hole through the cut-outs and measures the interior surface of the centering hole.

In the present invention, the second end support portion is preferably coupled to a rotary table and the columnar work piece is rotated in conjunction with rotation of the rotary table. The first end support portion is preferably fixated so as to be incapable of rotation while sliding between the first end support body and the columnar work piece is allowed.

In the present invention, the first end support portion preferably advances and retreats the first support body in a direction of an axial line of the columnar work piece, and includes a pressing portion (also referred to as a "pusher") pressing the first end support body into the columnar work piece. The pressing portion preferably includes a guide projection that enters the cut-out when the first end support body has retreated from the columnar work piece.

In the present invention, the pressing portion preferably includes a biasing force applier applying a biasing force that presses the first end support body into the columnar work piece; and a stopper stopping the advance of the first end support body when the first end support body advances in a state where the columnar work piece is not present, and applying to the biasing force applier a force resisting the biasing force of the biasing force applier.

A support mechanism of a columnar work piece according to the present invention is a support mechanism of a columnar work piece supporting an elongated, columnar work piece having a centering hole at two ends. The support mechanism includes a first end support portion supporting a first end of the columnar work piece; and a second end support portion supporting a second end of the columnar work piece. The first end support portion includes a first end support body attachably and detachably fitting into the centering hole of a first end of the columnar work piece. The first end support body includes at least two cut-outs, and in a state where the first end support body is fitted into the centering hole, an interior surface of the centering hole is visible to the exterior through the cut-outs.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
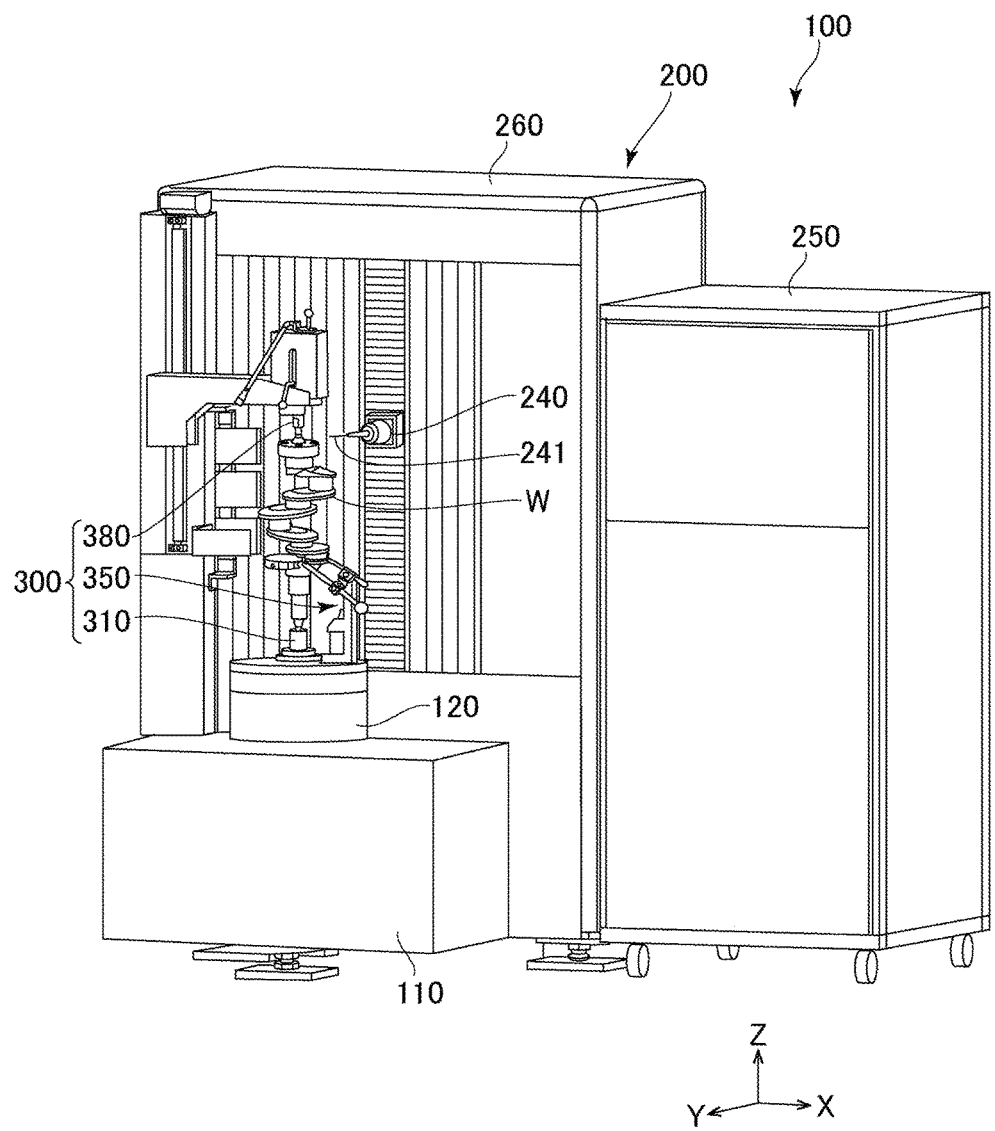
FIG. 1 is a perspective view schematically illustrating a measuring apparatus.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

A description of the embodiment of the present invention is given with reference to the drawings and to the reference numerals assigned to each component in the drawings.

First Embodiment

Figure 2:
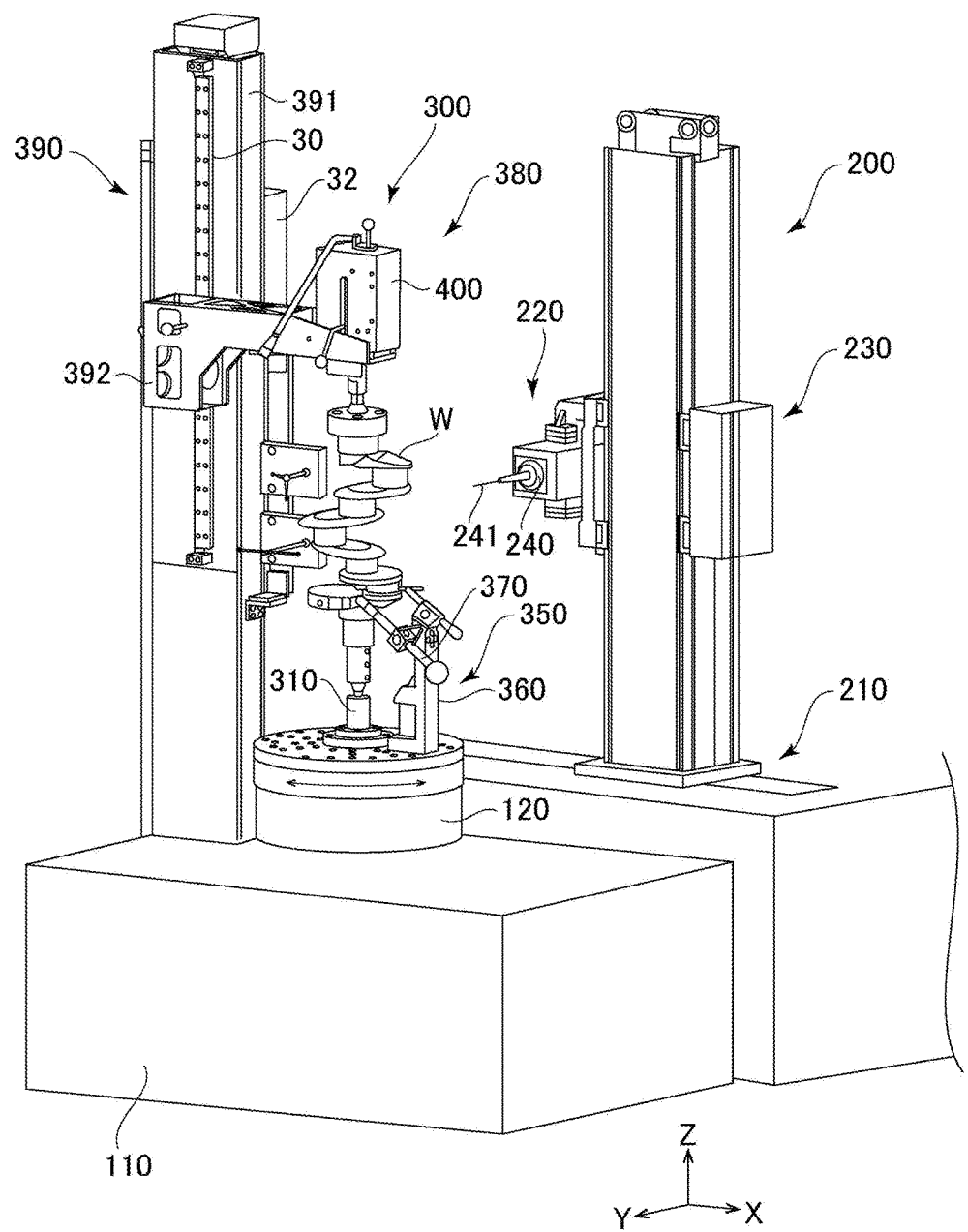
FIG. 2 is a perspective view schematically illustrating a coordinate measuring device with a casing removed.

FIG. 1 is a perspective view schematically illustrating a measuring apparatus 100. FIG. 2 is a perspective view schematically illustrating a coordinate measuring device 200 with a casing 260 removed.

The measuring apparatus 100 includes a base 110, the coordinate measuring device 200, and a support mechanism 300.

The base 110 is a frame member supporting the support mechanism 300 and the coordinate measuring device 200, and is installed such that the measuring apparatus 100 rests on the floor and a top surface is substantially horizontal. Moreover, a rotary table 120 is installed above the base 110, the rotary table 120 rotating centered on a vertical-direction rotation axis.

The coordinate measuring device 200 is arranged beside (in other words, in a direction orthogonal to the vertical direction) a columnar work piece W, which is supported vertically, and is what is known as a horizontal coordinate measuring device. The coordinate measuring device 200 brings a probe 241 close to the columnar work piece W from a lateral direction of the columnar work piece W (direction orthogonal to an axis direction of the columnar work piece W), and measures a shape of the columnar work piece W.

The coordinate measuring device 200 includes an X-axis drive mechanism (X-axis driver) 210, a Y-axis drive mechanism (Y-axis driver) 220, a Z-axis drive mechanism (Z-axis driver) 230, a probe head 240 processing device 250, and the casing 260. In FIGS. 1 and 2, a left-right direction is treated as an X axis, a direction inward from the sheet surface is treated as a Y axis, and an up-down direction is treated as a Z axis. Because coordinate measuring devices are well known, a detailed description thereof is omitted. However, in view of the description which follows, a brief explanation is herewith provided for the probe head 240.

Figure 3:
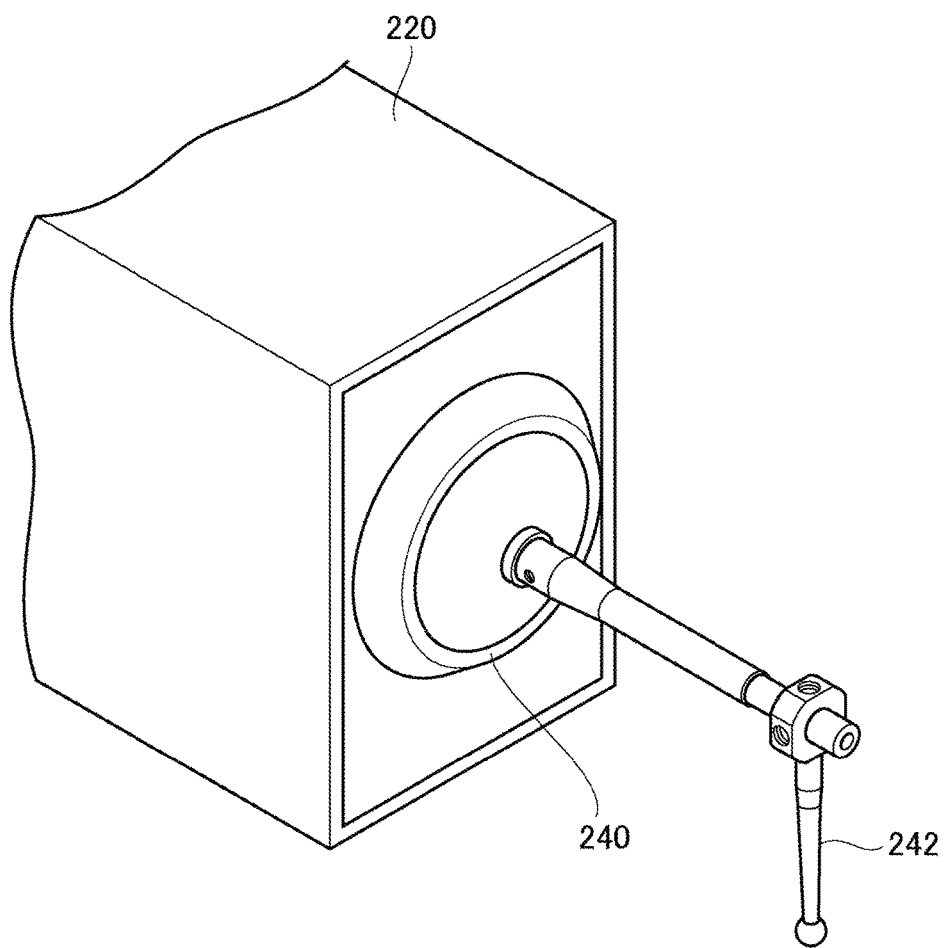
FIG. 3 illustrates an exemplary probe bent at a right angle at a midpoint.

The probe head 240 is provided to a slider on the Y-axis drive mechanism 220. Examples of the probe head 240 may include a probe head which allows free movement of a tip of a probe 241 in a plurality of rotation axes (for example, six axes of rotation). Alternatively, the probe head 240 may be a probe head in which the probe can be swapped in accordance with a shape of a measurement location. FIG. 3 illustrates an exemplary probe 242 bent at a right angle at a midpoint. Moreover, the probe head 240 is not limited to contact-type probes, and may of course be a non-contact-type probe instead.

The support mechanism 300 is now described. The support mechanism 300 supports the columnar work piece W, and in the present embodiment supports the columnar work piece W in a vertically oriented state. The support mechanism 300 includes a lower support portion 310, a rotation stopper 350, and an upper support portion 380.

Figure 4:
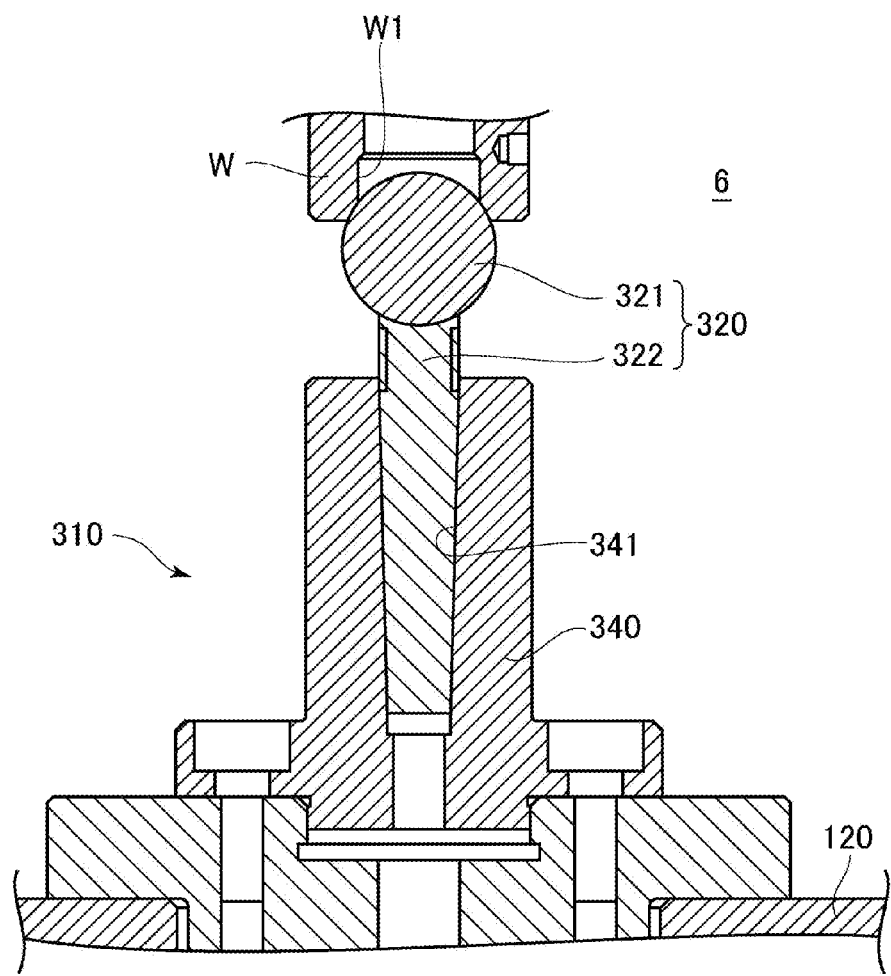
FIG. 4 is a cross-sectional view of a lower support portion.

FIG. 4 is a cross-sectional view of the lower support portion 310. The lower support portion 310 is provided on the rotary table 120 and supports a bottom end portion of the columnar work piece W, which is placed in a vertical orientation. The lower support portion 310 includes a lower work piece centering device 320 and a lower chuck 340.

The lower work piece centering device 320 includes a lower support body 321 and a shaft 322. The lower support body 321 is substantially spherical, and is fitted into a recess W1 formed in a bottom end surface of the columnar work piece W. The lower support body 321 makes contact with an inclined surface of the recess W1 and supports a lower side of the columnar work piece W. This ensures that there is no slippage between the lower support body 321 and the recess W1 of the columnar work piece W. The shaft 322 is a tapered, pole-like member narrowing in diameter toward the bottom. The lower support body 321 is coupled to a top end portion of the shaft 322. In this example, the lower support body 321 is treated as spherical; however, the lower support body 321 may also be conical.

The lower chuck 340 is a pole-like member that is long in the vertical direction, and stands upright on the rotary table 120. The lower chuck 340 has a hole 341 corresponding to the shaft 322, and the shaft 322 is inserted from above into the hole 341. At this point, the center of the lower support body 321 is brought onto the rotation axis of the rotary table 120. The shaft 322 is attachable and detachable with respect to the lower chuck 340, and is configured to enable the lower work piece centering device 320 to be swapped out in accordance with the columnar work piece W.

When the rotary table 120 is rotationally driven, the lower support portion 310 also rotates integrally with the rotary table 120. Accordingly, the rotary table 120, the lower support portion 310, and the columnar work piece W rotate integrally.

The rotation stopper 350 prevents relative rotation of the columnar work piece W with respect to the rotary table 120. The rotation stopper 350 includes an upright member 360 provided in an upright state on the rotary table 120, and an arm 370 provided to the upright member 360. By hooking the arm 370 on the columnar work piece W, the columnar work piece W rotates together with the rotary table 120.

The upper support portion 380 is now described. The upper support portion 380 supports the top end portion of the columnar work piece W. The upper support portion 380 includes a Z direction coarse movement mechanism 390 and a pressing portion 400.

The Z direction coarse movement mechanism 390 enables displacement of the pressing portion 400 in the Z direction, thereby displacing the pressing portion 400 to a position directly above the columnar work piece W. The Z direction coarse movement mechanism 390 includes a Z column 391 and a Z slider 392. The Z column 391 stands upright from the base 110 (parallel to the up-down direction) so as to be parallel to the columnar work piece W, which is supported in a vertical orientation. The Z slider 392 is provided so as to be capable of sliding displacement along the Z column 391. In addition, the Z slider 392 is locked at a desired position by a lock mechanism (not pictured). The pressing portion 400 is provided fixated to the Z slider 392.

Figure 5:
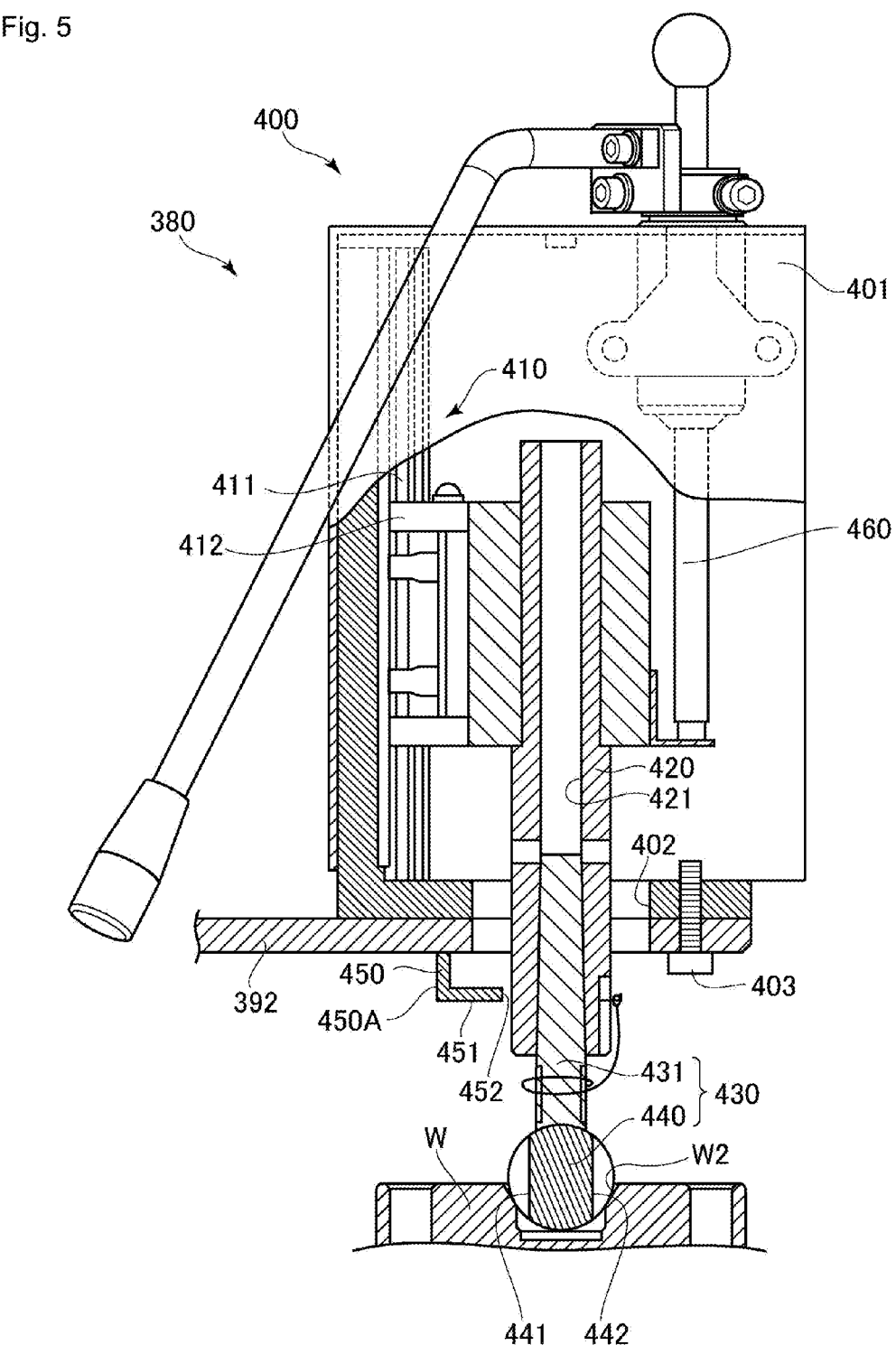
FIG. 5 is a partial cross-sectional view of a pressing portion.

FIG. 5 is a partial cross-sectional view of the pressing portion 400. By pressing downward on the top end of the columnar work piece W, the pressing portion 400 maintains the supported state of the columnar work piece W. The pressing portion 400 includes a casing 401, a Z direction fine movement mechanism 410, an upper chuck 420, an upper work piece centering device 430, a cut-out guide 450, a biasing force applier 460, and a stopper 403.

The casing 401 is provided fixated to the Z slider 392 and is configured to be capable of displacing in the Z direction together with the Z slider 392. In addition, the Z direction fine movement mechanism 410, upper chuck 420, and biasing force applier 460 are housed within the casing 401. The bottom end surface of the casing 401 and the Z slider 392 include an insertion hole 402 through which the upper chuck 420 and the upper work piece centering device 430 are inserted.

The Z direction fine movement mechanism 410 allows the upper work piece centering device 430 to perform slight relative displacement in the Z direction with respect to the Z slider 392. The Z direction fine movement mechanism 410 includes a guide shaft 411 and a fine movement slider 412. The guide shaft 411 is provided within the casing 401 so as to extend in the vertical direction (Z direction). The fine movement slider 412 is provided to the guide shaft 411 so as to enable displacement in the Z direction along the guide shaft 411. The upper chuck 420 is mounted so as to be fixated to the fine movement slider 412.

The upper chuck 420 is a pole-like member extending in the vertical direction (Z direction), and an area near a top end thereof is fixated to the fine movement slider 412. The upper chuck 420 hangs downward from the fine movement slider 412, and a forefront end thereof exits to an exterior of the casing 401 through the insertion hole 402. The upper chuck 420 includes a hole 421 bored in the vertical direction (Z direction), an interior wall of which is tapered so as to increase in diameter toward the bottom. The upper work piece centering device 430 is inserted into the hole 421. The upper chuck 420 is attached so as to be fixated to the fine movement slider 412 and, unlike the lower chuck 340, the upper chuck 420 does not rotate.

Figure 6:
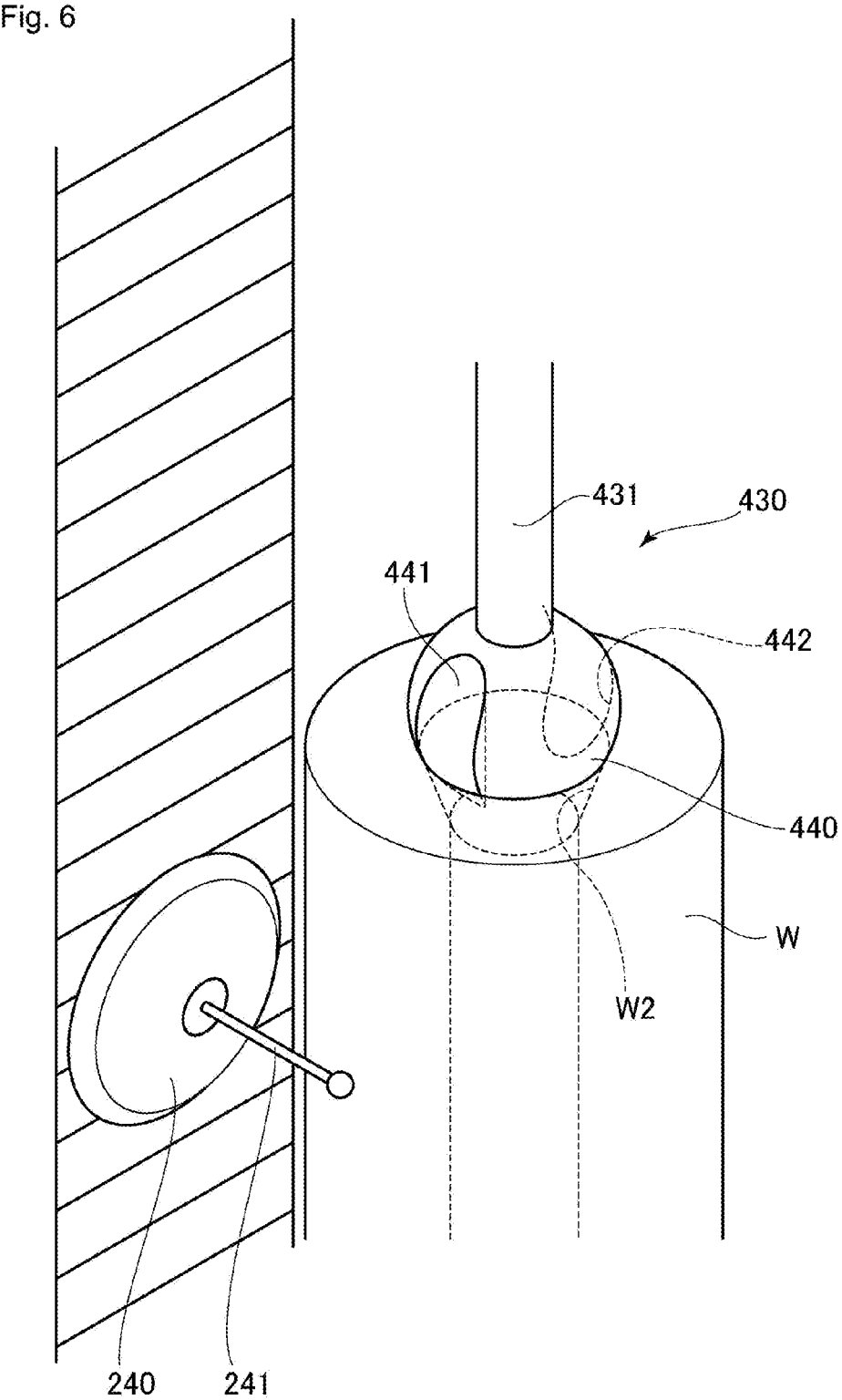
FIG. 6 is a perspective view of a state where a top end surface of a columnar workpiece is supported by an upper work piece centering device.

FIG. 6 is a perspective view of a state where a top end surface W2 of the columnar work piece W is supported by the upper work piece centering device 430. The upper work piece centering device 430 includes an upper support body 440 and a shaft 431.

The upper support body 440 is fitted into a recess W2 formed in the top end surface of the columnar work piece W and touches an inclined surface of the recess W2. The shaft 431 is a tapered, pole-like member narrowing in diameter toward the top. The upper support body 440 is coupled to a bottom end portion of the shaft 431. The shaft 431 and the upper support body 440 may also be integrally formed.

When the shaft 431 is inserted into the upper chuck 420, the center of the upper support body 440 is configured to lie on the rotation axis of the rotary table 120. Moreover, the upper work piece centering device 430 is inserted into the fixated upper chuck 420 so as to be fixated, and unlike the lower work piece centering device 320, the upper work piece centering device 430 does not rotate. Accordingly, sliding inevitably occurs between the upper support body 440 and the upper recess W2 of the columnar work piece W. Therefore, the upper support body 440 is formed of material that is unlikely to wear down, such as a superhard alloy (for example, tungsten carbide), and a surface thereof is finished to a mirror surface so as to facilitate sliding.

Figure 7:
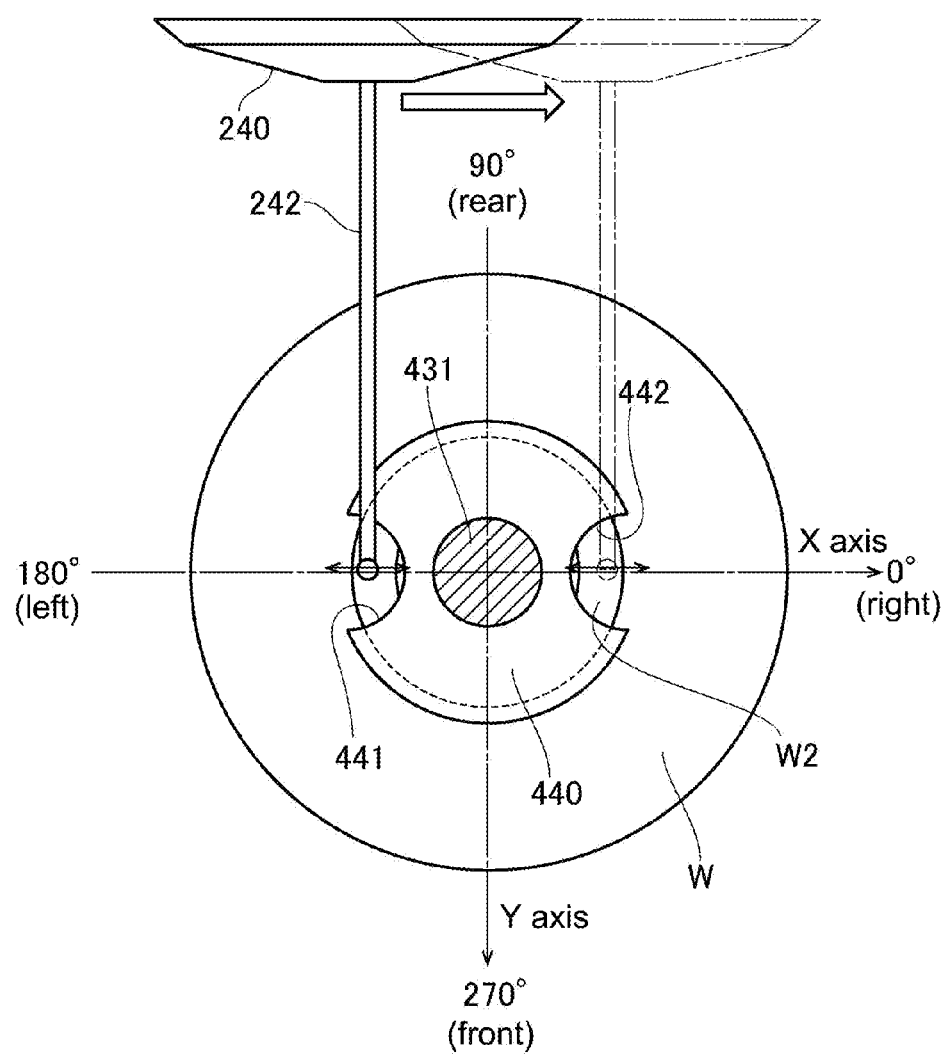
FIG. 7 is a diagram of a shaft in cross-section, viewing the upper work piece centering device from above.

In this example, as shown in FIG. 6, an overall profile of the upper support body 440 is spherical; however, the upper support body 440 has two cut-outs 441 and 442. Positioning of the cut-outs 441 and 442 is now described. FIG. 7 is a diagram of the shaft 431 in cross-section, viewing the upper work piece centering device 430 from above. In FIG. 7, the left-right direction is equivalent to the X axis. In addition, in FIG. 7, the up-down direction is equivalent to the Y axis. For the purposes of description, in FIG. 7, the center of the upper support body 440 is taken as the center of the coordinate plane, and angles are read by rotating left from the positive direction of the X axis.

Figure 8:
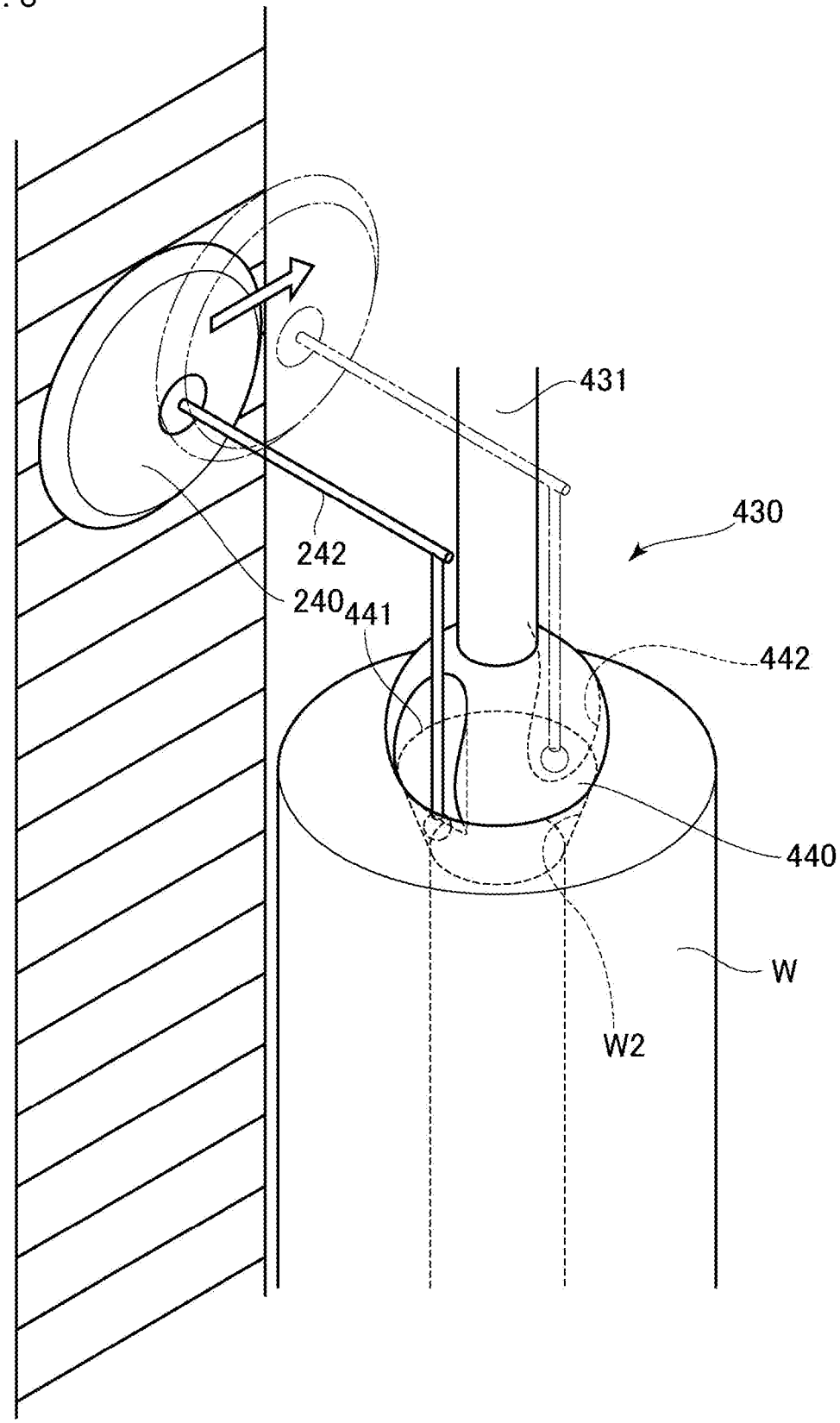
FIG. 8 illustrates the probe inserted through cut-outs into an inwardly tapered surface of the columnar work piece.

When the upper support body 440 is viewed from above, the cut-outs 441 and 442 are at the 0° position and 180° position. The cut-out at the 0° position is designated the right cut-out 442, and the cut-out at the 180° position is designated the left cut-out 441. When cut by a plane running through the center of the ball on the upper support body 440 and orthogonal to the axis of the shaft 431, the cut-outs 441 and 442 have substantially a semicircular shape. In addition, the cut-outs 441 and 442 are formed in a state bored in a direction parallel to the axis of the shaft 431 (Z direction). The cut-outs 441 and 442 are not limited to the shape described above, and may instead, for example, be carved so as to have a rectangular or triangular shape in cross-section. The upper support body 440 has two cut-outs in a diameter direction; however, after the positions of the cut-outs are aligned so as to match 0° and 180° in the coordinate system of the measuring apparatus 100 (machine coordinate system), the shaft 431 may be understood to be inserted into the upper chuck 420. In addition, as shown in FIG. 7, the upper support body 440 is fitted into the top end surface W2 of the columnar work piece W and, when this is viewed from above, the inwardly tapered surface (W2) of the columnar work piece W can be seen through the cut-outs 441 and 442. The coordinate measuring device 200 displaces the probe head 240 in the Y axis direction and brings the probe 242 toward the columnar work piece W. Moreover, by displacing the probe 242 downward, as shown in FIGS. 7 and 8, the probe 242 can be inserted through the cut-outs 441 and 442 to contact the inwardly tapered surface (W2) of the columnar work piece W.

Figure 9:
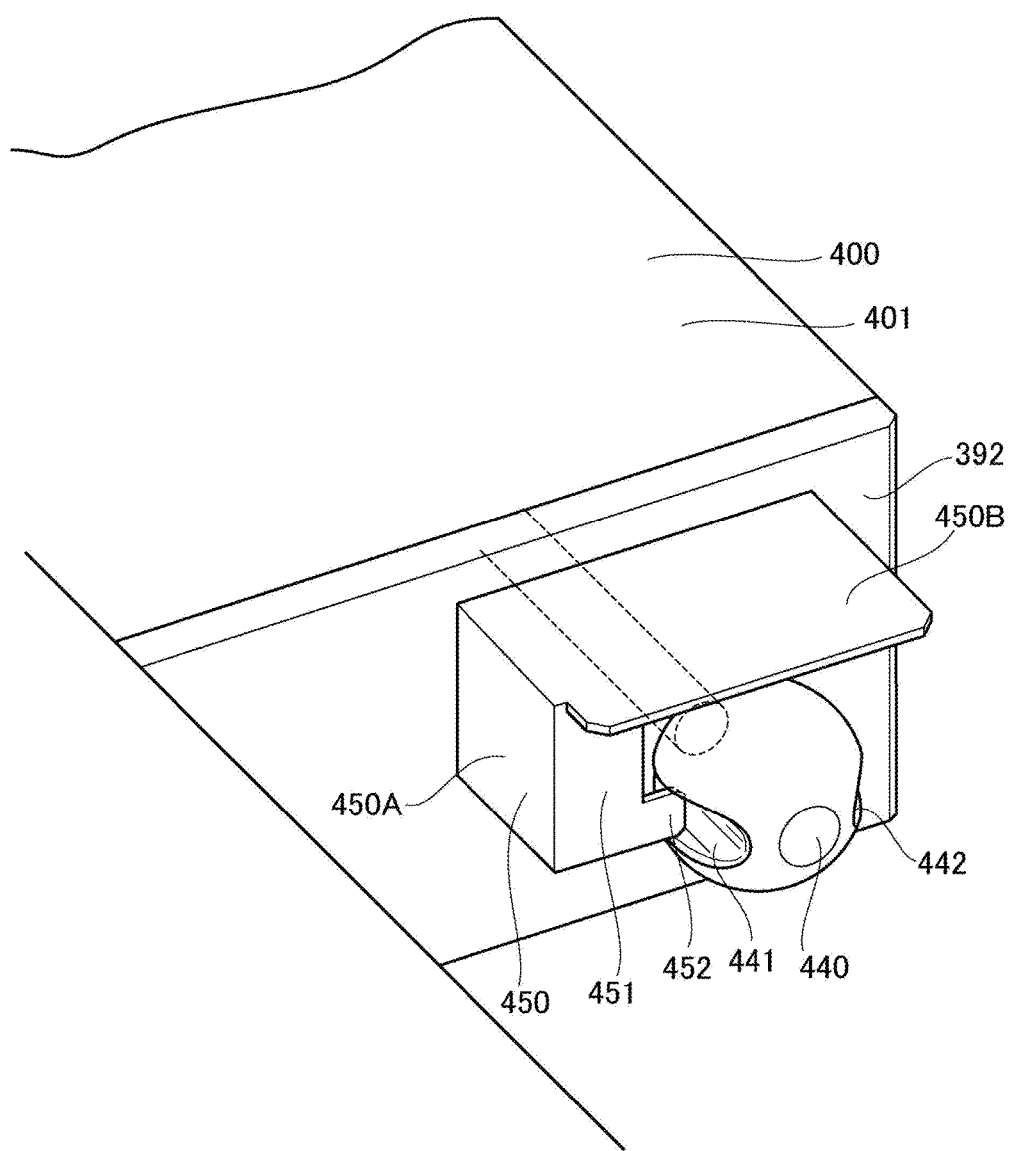
FIG. 9 is a digram of a bottom surface of a Z slider viewed from below.

Next, FIG. 9 is a diagram of a bottom surface of the Z slider 392 viewed from below. A cut-out guide 450 is provided directly beside the insertion hole 402 on the bottom surface of the Z slider 392. The cut-out guide 450 includes a first upright piece 450A, a second upright piece 450B, and a guide piece 451. The first upright piece 450A is provided standing upright from the bottom surface of the Z slider 392 along the YZ plane. The second upright piece 450B is provided standing upright from the bottom surface of the Z slider 392 along the XZ plane and intersecting with the first upright piece 450A. The guide piece 451 is a thin plate protruding parallel to the XY plane on a forefront end portion of the first upright piece 450A (forefront end on an opposite side from the bottom surface side of the Z slider 392).

On an end portion side of the guide piece 451 that is parallel to the Y direction and on an opposite side from the first upright piece 450A, in a vicinity of one side that is parallel to the X direction, the guide piece 451 has the guide projection 452 which juts in the X direction, the opposite direction from the first upright piece 450A. In other words, the guide piece 451 has substantially an "L" shape in a plan view. The guide projection 452 of the guide piece 451 is configured to enter the cut-out 441 of the upper support body 440 when the upper work piece centering device 430 is displaced upward by the fine movement slider 412. The guide projection 452 projects parallel to the X axis and, in this example, protrudes from negative to positive in the X axis direction (a direction from left to right in FIG. 9). Accordingly, the guide projection 452 enters the left cut-out 441 of the upper support body 440 when the upper work piece centering device 430 is displaced upward. In addition, a height of the second upright piece 450B (length of a side parallel to the Z direction) is made higher than the height of the first upright piece 450A. (The second upright piece 450B has a configuration jutting further downward than the first upright piece 450A.) Therefore, during a state where the upper work piece centering device 430 is displaced upward by the fine movement slider 412 and the guide projection 452 has entered the cut-out 441 of the upper support body 440, a portion of the upper support body 440 is in a state protected by the forefront end portion of the second upright piece 450B.

As described above, the upper work piece centering device 430 is inserted into the upper chuck 420 such that the positions of the cut-outs 441 and 442 align with 0° and 180°, in terms of the coordinate system of the measuring apparatus 100 (machine coordinate system). Whether this alignment was done correctly may be confirmed by checking whether the guide projection 452 is in the left cut-out 441. Conversely, in a case where the upper support body 440 gets stuck on the guide projection 452 when the upper work piece centering device 430 is displaced upward using the Z direction fine movement mechanism 410, the cut-outs 441 and 442 are misaligned.

The biasing force applier 460 maintains the state in which the upper work piece centering device 430 is pressed against the top end surface W2 of the columnar work piece W. The biasing force applier 460 is housed within the casing 401 and is connected to the fine movement slider 412. The biasing force applier 460 may simply be a mechanism imparting a downward biasing force on the fine movement slider 412, and may for example be configured by an air cylinder, an elastic body (spring, rubber), or the like.

Figure 10:
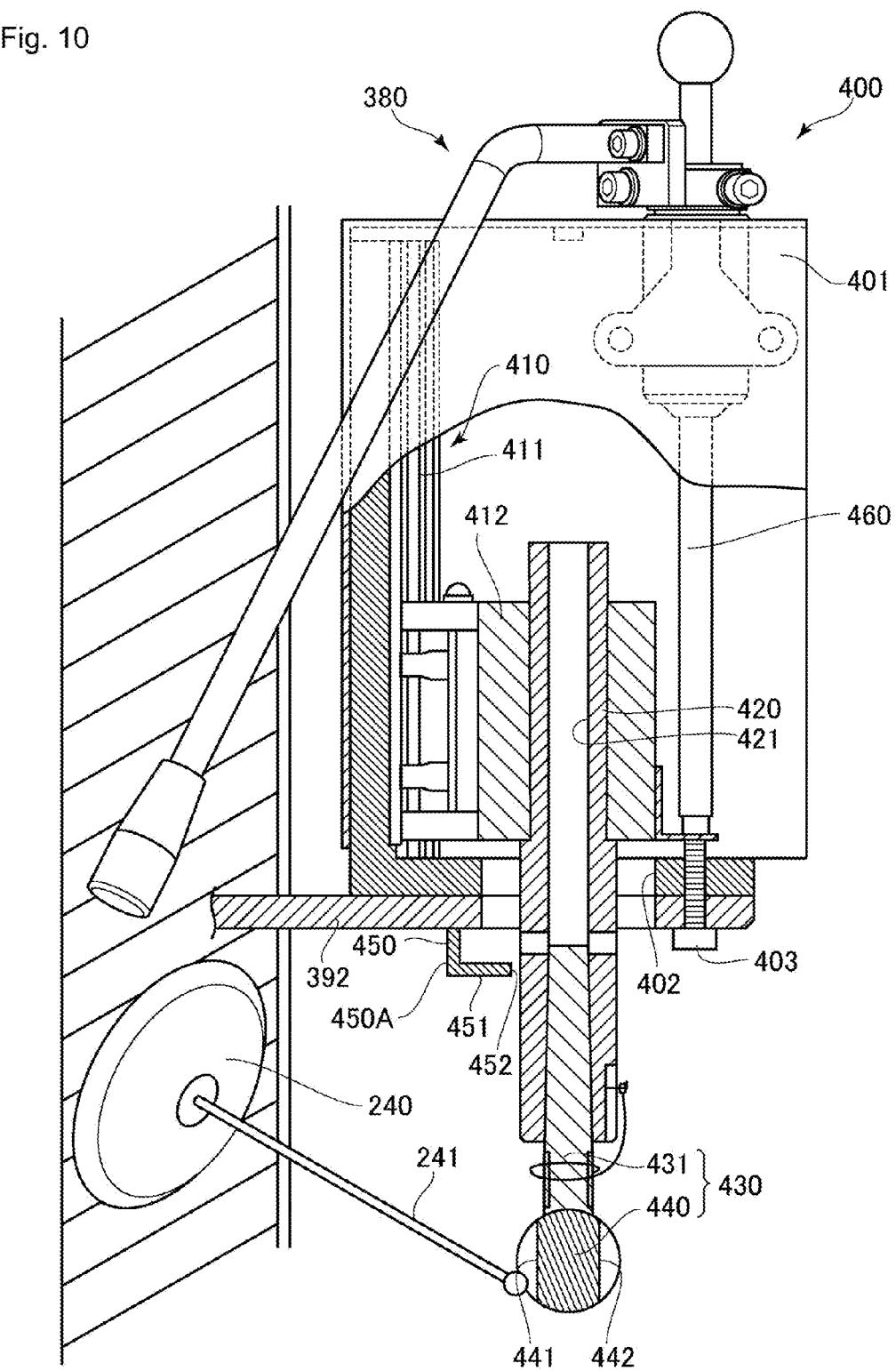
FIG. 10 illustrates the upper work piece centering device in a state lowered to its lowest point, with the columnar work piece removed.

The stopper 403 is a projection resisting the biasing force of the biasing force applier 460, and projects upward from a bottom surface on an interior of the casing 401. In this example, the stopper screw 403 is threaded in from below the Z slider 392 and the casing 401, and a forefront end of the stopper screw 403 is configured to project toward the interior of the casing 401. FIG. 10 illustrates the upper work piece centering device 430 in a state lowered to its lowest point, with the columnar work piece W removed. At this point, the fine movement slider 412 descends to the lowest point and a back surface of the fine movement slider 412 strikes the forefront end of the stopper 403. In this state, when the fine movement slider 412 is biased downward by the biasing force applier 460, the fine movement slider 412 presses against the stopper 403, thereby fixating the position of the fine movement slider 412. In other words, even when the columnar work piece W is not present, the position of the upper work piece centering device 430 is fixated.

(Operations and Actions during Measurement)

Next, operations and actions of measuring the columnar work piece W using the measuring apparatus are described. First, the columnar work piece W is supported by the support mechanism 300. The columnar work piece W is oriented vertically and the bottom recess W1 of the columnar work piece W is rested on the lower support body 321. Next, the Z slider 392 is lifted upward by the Z direction coarse movement mechanism 390, and when the Z slider 392 reaches a vicinity directly above the columnar work piece W, the position of the Z slider 392 is locked. In addition, the upper support body 440 is fitted into the upper recess W1 of the columnar work piece W and, moreover, the upper work piece centering device 430 is pressed downward into the biasing force applier 460. Thereby, the columnar work piece W is supported in the vertical orientation. Furthermore, the arm 370 of the rotation stopper 350 is hooked on the columnar work piece W.

The rotary table 120 is made to rotate in this state. When the rotary table 120 rotates, the lower work piece centering device 320 and rotation stopper 350 rotate together with the rotary table 120, and thus the columnar work piece W rotates together with the rotary table 120. The coordinate measuring device 200 drives the X-axis drive mechanism 210, the Y-axis drive mechanism 220, and the Z-axis drive mechanism 230; the probe 241 is brought into contact with the side surface of the columnar work piece W; and shape measurement of the columnar work piece W is performed. In this regard, the upper work piece centering device 430 does not rotate, and the upper end surface (W2) of the columnar work piece W slides with respect to the fixated upper support body 440.

In the present embodiment, the shape of the upper recess W2 of the columnar work piece W is measured. In other words, in addition to measuring profile irregularities in the tapered surface of the upper recess W2, the center axis is found. In this example, the upper work piece centering device 430 does not rotate, and therefore is maintained in the same state as when it was attached. In other words, the positions of the cut-outs 441 and 442 are 0° and 180° in terms of the coordinate system of the measuring apparatus 100 (machine coordinate system). The probe of the coordinate measuring device 200 is swapped out for the probe 242, which is bent in a right angle as shown in FIG. 3, for example. In addition, as shown in FIGS. 7 and 8, the probe 242 is inserted through the left and right cut-outs 441 and 442 of the upper support body 440, and the upper recess W2 of the columnar work piece W is directly measured. Moreover, a parts program for measuring the upper recess W2 may be incorporated in advance for the measurement of the upper recess W2. In other words, the parts program takes into consideration the size (diameter) of the upper support body 440, the positions of the cut-outs 441 and 442 (0° and 180° in the machine coordinate system), and the sizes of the cut-outs 441 and 442 and sets a path to insert the probe 242 into the cut-outs 441 and 442, which are provided at two locations.

In this way, the shape of the interior and exterior of the columnar work piece W may be measured.

(Managing Wear of Upper Support Body)

As described above, because the upper support body 440 is fixated, sliding inevitably occurs between the upper support body 440 and the upper recess W2 of the columnar work piece W. The upper support body 440 is formed of a superhard alloy (for example, tungsten carbide), and a surface thereof is finished to a mirror surface so as to facilitate sliding. However, there is still a possibility that the upper support body 440 will be abraded by the columnar work piece W. Thus, shape measurement of the upper support body 440 is performed periodically. In such a case, as shown by FIG. 10, the columnar work piece W is removed and the upper work piece centering device 430 is lowered to its lowest point. At this point, the bottom surface of the fine movement slider 412 strikes the stopper 403. Moreover, the fine movement slider 412 is biased downward by the biasing force applier 460. When this occurs, the position of the fine movement slider 412 is fixated in a state pressed against the stopper 403. Also, as shown in FIG. 10, the shape of the upper support body 440 is measured by the probe 241. At this point, the position of the fine movement slider 412 is fixated. In other words, the upper support body 440 stops, and therefore the upper support body 440 can be measured with a high degree of accuracy in a stable state.

The following beneficial effects are achieved with the first embodiment having the above-noted configuration. (1) In the present embodiment, the cut-outs 441 and 442 are provided to the upper support body 440 in two locations. By inserting the probe 242 through the cut-outs 441 and 442, the interior surface W2 of the columnar work piece W can be directly measured.

Figure 11:
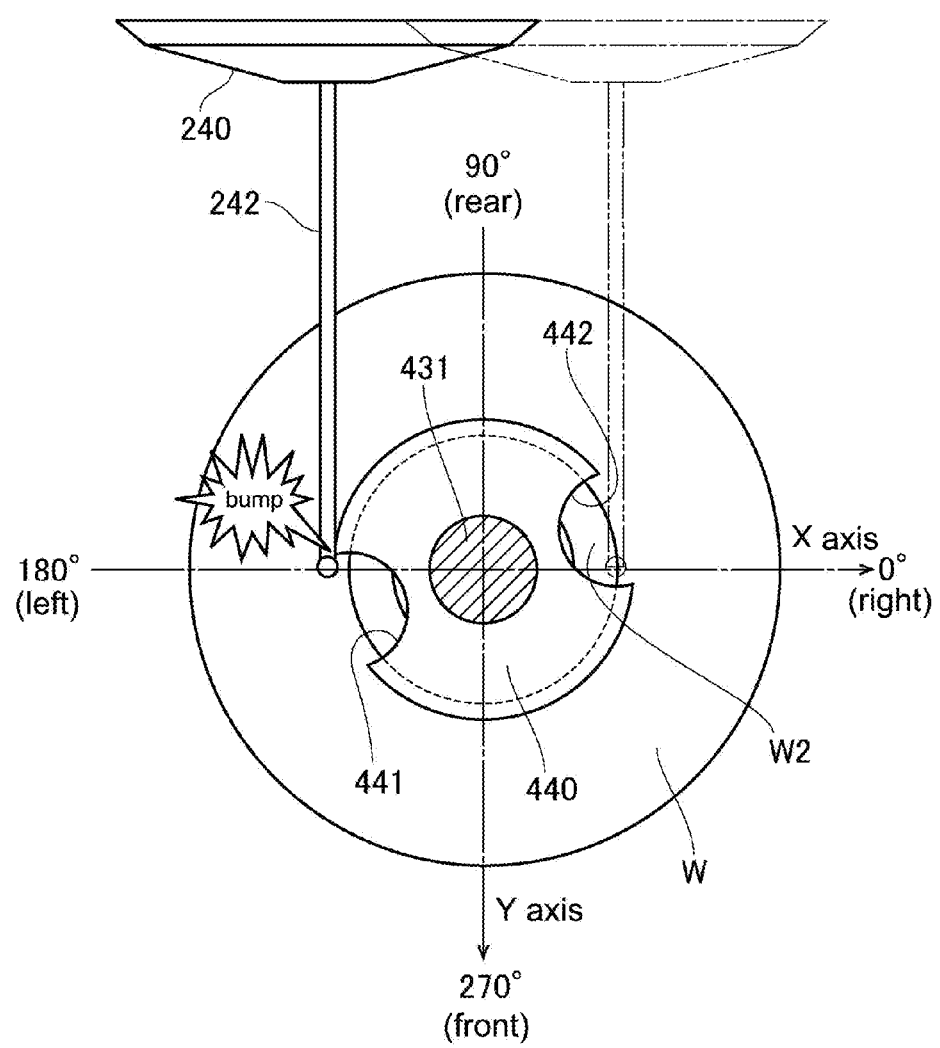
FIG. 11 illustrates an exemplary state where the probe and an upper support body collide.

(2) In the present embodiment, the upper work piece centering device 430 is configured so as not to rotate. Accordingly, the positions of the cut-outs 441 and 442 of the upper support body 440 are fixed, and the probe 242 can be inserted without obstruction into the two cut-out locations 441 and 442. In this example, even when the upper support body 440 rotates, inserting the probe 242 toward the cut-outs 441 and 442 may be considered sufficient. However, the following concerns may be anticipated. When the positions of the cut-outs 441 and 442 differ every time, the probe 242 must be inserted into the cut-outs 441 and 442 with a manual operation every time. However, manual operation requires an extremely high degree of technical skill and also takes time. Performing such manual operation for each work piece is not feasible in reality. In which case, causing the rotary table 120 to rotate such that the positions of the cut-outs 441 and 442 occupy positions determined each time (0° and 180° in the machine coordinate system) may also be considered. However, manual input to indicate the phase (angle) of the rotary table 120 requires a high degree of technical skill, and also takes time. When the positions of the cut-outs 441 and 442 are offset even slightly from the predetermined positions, as shown in FIG. 11, the probe 242 may collide with the upper support body 440. In this regard, when rotation of the upper work piece centering device 430 is stopped as in the present embodiment, the positions of the cut-outs 441 and 442 typically do not change and, using the parts program for example, the probe 242 can be automatically inserted into the cut-outs without obstruction.

(3) In the present embodiment, the stopper 403 is provided and, even when the columnar work piece W is not present, the position of the upper work piece centering device 430 can be fixated. As described above, when the upper work piece centering device 430 stops, wear occurs between the upper support body 440 and the columnar work piece W. Accordingly, it becomes necessary to manage the wear of the upper support body 440. In this example, in a hypothetical state where there is no stopper, the downward biasing force from the biasing force applier 460 is not fully achieved and the position of the upper support body 440 may fluctuate. In addition, when measurement pressure of the probe 241 is applied to the upper support body 440, the upper support body 440 may wobble. The upper support body 440 may actually displace approximately 20 µm due to the measurement pressure of the probe 241, which makes accurate measurement of the sphericity of the upper support body 440 impossible. In this regard, by having the stopper 403, the biasing force of the biasing force applier 460 may be fully achieved. (In other words, the elastic body of the biasing force applier 460 or the air within the cylinder can be adequately compressed, and therefore a substantial biasing force may be achieved.) Accordingly, displacement of the upper support body 440 is inhibited (1 µm or less, for example).

(4) In the present embodiment, the cut-out guide 450 is provided. As noted above, when the positions of the cut-outs 441 and 442 are offset even slightly from the predetermined positions, the probe 242 may collide with the upper support body 440. In this regard, the guide projection 452 enters the cut-out 441 and, when no collision between the guide piece 451 and the upper support body 440 occurs, the positions of the cut-outs 441 and 442 can be confirmed to be appropriate.

First Modification

Figure 12:
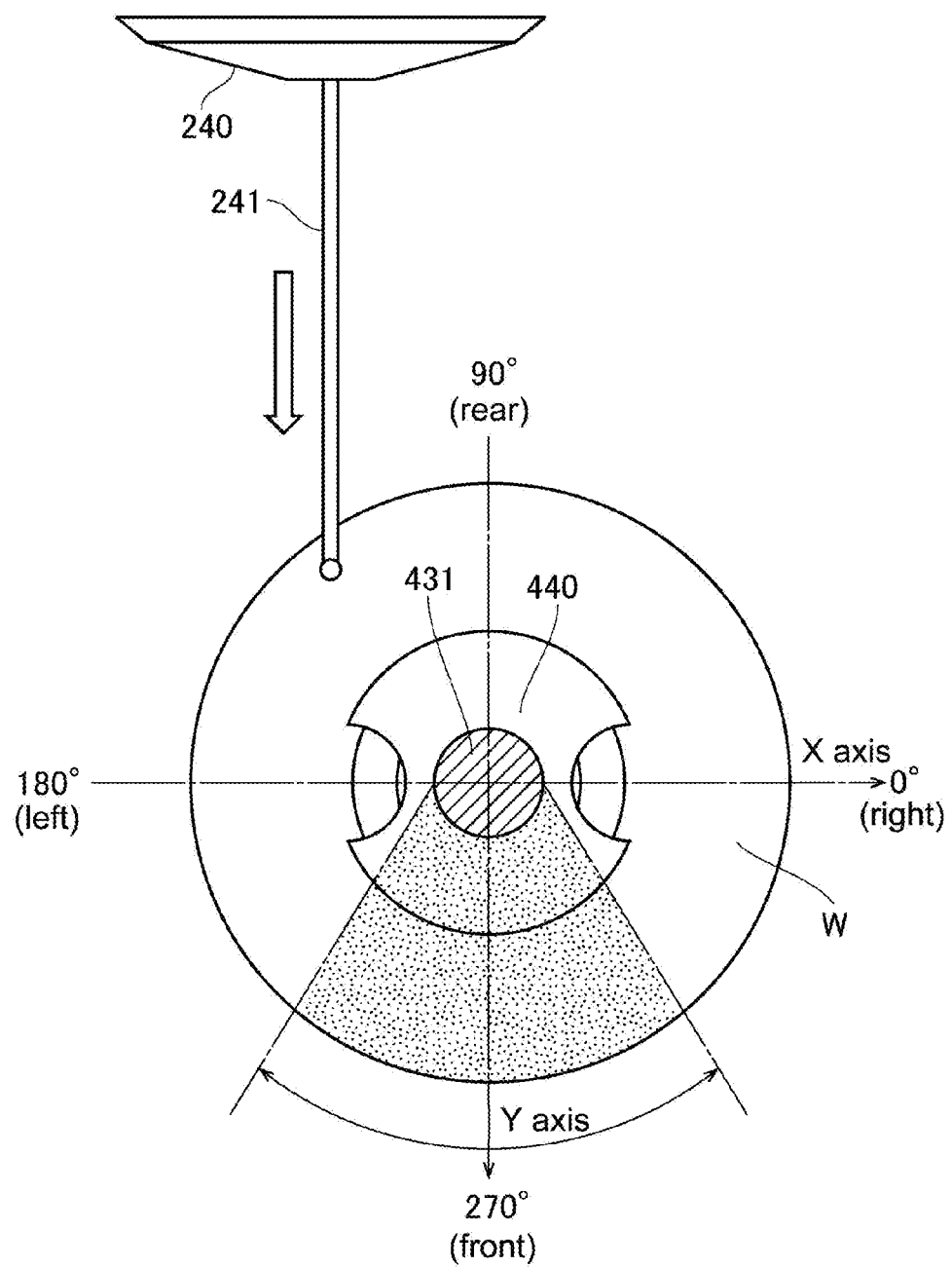
FIG. 12 illustrates an exemplary region where the shaft becomes an obstacle and into which the probe cannot be inserted.

In the first embodiment described above, the upper support body 440 is substantially spherical and has two cut-outs 441 and 442 in the diameter direction. Of course, when the interior surface (W2) of the columnar work piece W can be directly measured, the shape of the upper support body 440 can be changed. For example, the positions of the cut-outs may be changed. The probe 242 must be moved in the Y-axis direction and approach the cut-outs, but as shown in FIG. 12, due to the presence of the shaft 431, approach is not possible when the cut-outs are on the opposite side of the coordinate measuring device 200 with the shaft 431 between the probe and the cut-outs. In FIG. 12, a dotted region is a region where the shaft 431 becomes an obstacle and into which the probe 242 cannot be inserted. (Of course, this merely indicates that the region cannot be used for measurement: a cut-out may be provided in this region.)

Figure 13:
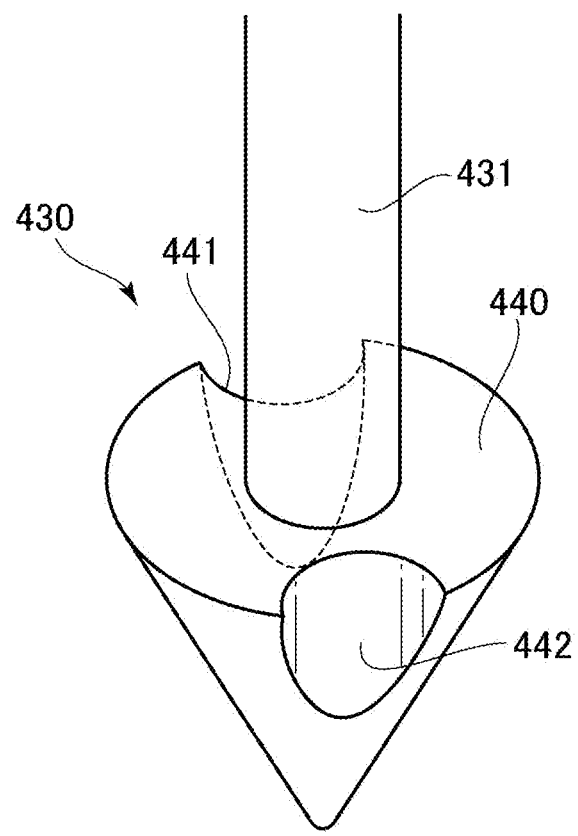
FIG. 13 illustrates an exemplary case, as a modification, where the upper support body has a cone form.
Figure 14:
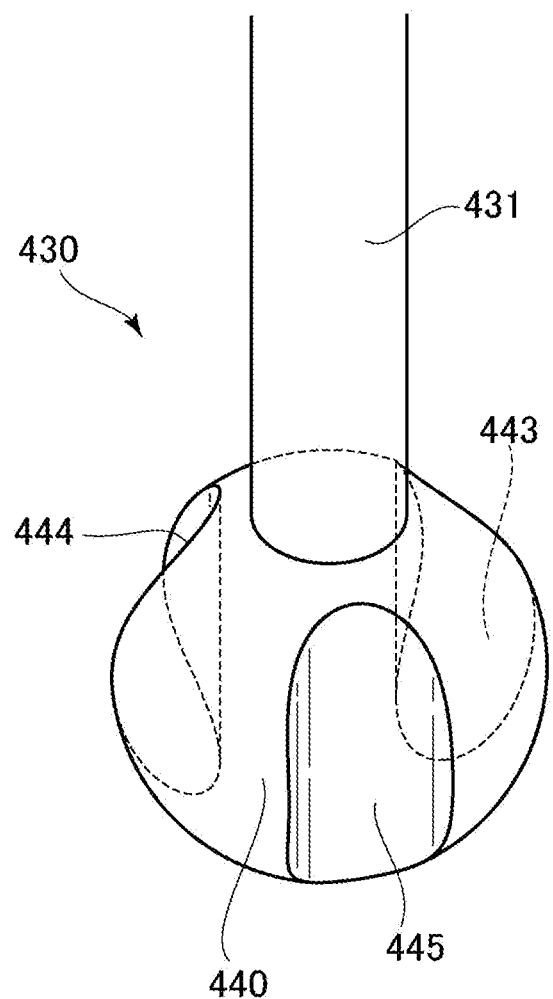
FIG. 14 illustrates an exemplary case, as a modification, where three cut-outs are provided to the upper support body.
Figure 15:
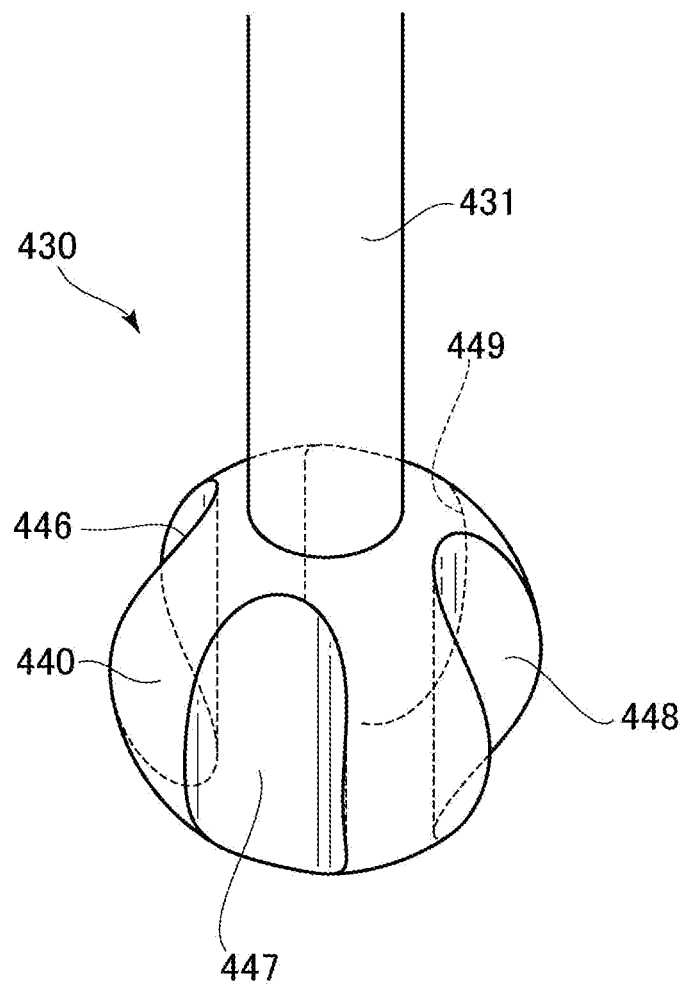
FIG. 15 illustrates an exemplary case, as a modification, where four cut-outs are provided to the upper support body.

FIG. 13 is an example of a case where the upper support body 440 has a cone form. FIG. 14 is an exemplary view of a case where three cut-outs 443, 444, and 445 are provided at intervals of 120°. FIG. 15 is an exemplary view of a case where four cut-outs 446, 447, 448, and 449 are provided at intervals of 90°.

Second Modification

In the first embodiment described above, the upper work piece centering device 430 is described as not rotating. This is a strategy to prevent a collision between the probe 242 and the upper support body 440. When a collision between the probe 242 and the upper support body 440 can be avoided, rotation of the upper work piece centering device 430 may be allowed. When the upper work piece centering device 430 (upper support body 440) rotates, the measuring apparatus 100 no longer knows where the cut-out is positioned. However, when the position of the cut-out can be detected by some method, a collision between the probe 242 and the upper support body 440 can be avoided. For example, before measuring the recess W2 of the columnar work piece W, a tracing measurement may first be performed on the upper support body 440 and the position of the cut-out verified. Alternatively, lasers may be fired at the upper support body 440 from a plurality of directions and the position of the cut-out verified by laser ranging.

Alternatively, when the upper support body 440 is lifted upward, the cut-outs 441 and 442 of the upper support body 440 are aligned with predetermined positions, and the upper support body 440 is fitted into the recess W2 of the columnar work piece W while maintaining that state (without rotation). In addition, the inwardly tapered surface of the recess W2 is measured as an initial measurement item. Specifically, before rotating the upper support body 440 together with the columnar work piece W, the probe 242 is inserted through the cut-outs 441 and 442 and may measure the inwardly tapered surface of the recess W2. With this method (operation order), rotation of the upper support body 440 may be allowed.

The guide projection 452 described above can be used in order to align the cut-outs 441 and 442 of the upper support body 440 with the predetermined positions when the upper support body 440 is lifted upward. Moreover, when a downward-pointing pyramid is provided to the bottom surface of the guide projection 452, or when the number of cut-outs on the upper support body 440 is increased (for example to 3, 4, or more), the angle of the upper support body 440 is guided such that the cut-outs align with the guide projection 452 when the upper support body 440 is lifted upward. Accordingly, with a natural operation of simply lowering the upper support body 440 from the raised state, the columnar work piece can be held in a state where the cut-outs 441 and 442 of the upper support body 440 are aligned with the predetermined positions.

Moreover, the present invention is not limited to the embodiments described above, and may be modified as needed without departing from the scope of the present invention. In the above description, an exemplary case was described where the columnar work piece is supported in a vertical orientation. However, the columnar work piece may also be supported in a lateral orientation. The coordinate measuring device is not limited to the so-called horizontal coordinate measuring device and may instead be a vertical coordinate measuring device.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A measuring apparatus measuring an elongated, columnar work piece having a centering aperture at two ends, the measuring apparatus comprising:
   a first end support configured to support a first end of the columnar work piece;
   a second end support configured to support a second end of the columnar work piece; and
   a measurer having a probe configured to measure the columnar work piece supported by the first end support and the second end support, wherein:
   the first end support includes a first end support body configured to attachably and detachably fit into the centering aperture of the first end of the columnar work piece,
   the first end support body includes at least two cut-outs,
   in a state where the first end support body is fitted into the centering aperture, an interior surface of the centering aperture is visible to the exterior through the cut-outs, and
   the measurer is configured to insert the probe into the centering aperture through the cut-outs and measure the interior surface of the centering aperture.

2. The measuring apparatus according to claim 1, wherein:
   the second end support is coupled to a rotary table and the columnar work piece is configured to rotate in conjunction with rotation of the rotary table;
   the first end support is fixed so as to be non-rotatable while being slidable between the first end support body and the columnar work piece.

3. The measuring apparatus according to claim 2, wherein:
   the first end support is configured to advance and retreat the first support body in a direction of an axial length of the columnar work piece, and includes a pusher configured to press the first end support body into the columnar work piece, and
   the pusher includes a guide configured to enter the cut-out when the first end support body has retreated from the columnar work piece.

4. The measuring apparatus according to claim 3, wherein the pusher comprises:
   a biasing force applier configured to apply a biasing force which presses the first end support body into the columnar work piece; and
   a stopper configured to stop the advance of the first end support body when the first end support body advances in a state where the columnar work piece is not present, the stopper further configured to apply, to the biasing force applier, a force resisting the biasing force of the biasing force applier.

5. A support mechanism of a columnar work piece supporting an elongated, columnar work piece having a centering aperture at two ends, the support mechanism comprising:

a first end support configured to support a first end of the columnar work piece; and a second end support configured to support a second end of the columnar work piece, wherein:

the first end support includes a first end support body configured to attachably and detachably fit into the centering aperture of a first end of the columnar work piece, the first end support body includes at least two cut-outs, and in a state where the first end support body is fit into the centering aperture, an interior surface of the centering aperture is visible to the exterior through the cut-outs.

* * * * *